(12) United States Patent
Farquharson et al.

(10) Patent No.: US 7,363,509 B2
(45) Date of Patent: Apr. 22, 2008

(54) METHOD, SYSTEM AND PROGRAM PRODUCT FOR ELECTRONICALLY EXECUTING CONTRACTS WITHIN A SECURE COMPUTER INFRASTRUCTURE

(75) Inventors: Aston G. Farquharson, Carmel, NY (US); Michael J. Cammarota, New Fairfield, CT (US); John R. Harrison, Little Rock, AK (US); Thomas Y. Kwok, Washington Township, NJ (US); Linh Hue Lam, Yorktown Heights, NY (US); Thao N. Nguyen, Katonah, NY (US); Michael A. Penn, Upper Grandview, NY (US); Kakan Roy, Larchmont, NY (US); Michael B. Sandler, New York, NY (US); Gary D. Wexler, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 10/761,551

(22) Filed: Jan. 21, 2004

(65) Prior Publication Data

US 2005/0160278 A1    Jul. 21, 2005

(51) Int. Cl.
*H04L 9/32* (2006.01)
(52) U.S. Cl. .................. 713/189; 713/161; 713/169
(58) Field of Classification Search ........... 713/189, 713/161, 169
See application file for complete search history.

(56) References Cited

U.S. PATENT DOCUMENTS 5,748,738 A    5/1998    Bisbee et al.

| | | |
|---|---|---|
| 6,141,653 A | 10/2000 | Conklin et al. |
| 6,336,105 B1 | 1/2002 | Conklin et al. |
| 6,338,050 B1 | 1/2002 | Conklin et al. |
| 7,051,364 B1* | 5/2006 | Tackman et al. ............... 726/3 |

(Continued)

FOREIGN PATENT DOCUMENTS

JP    PUPA 2001-357322    12/2001

(Continued)

OTHER PUBLICATIONS

"International Materials For IDS" from JPO dated Sep. 26, 2007, prepared by Tadahiko Kataoka.

*Primary Examiner*—Ellen Tran
(74) *Attorney, Agent, or Firm*—William E. Scheisser; Hoffman, Warnick & D'Alessandro LLC

(57) ABSTRACT

Under the present invention, a customized contract is created based on the needs of the parties and is then stored within a secure computer infrastructure. Security within the computer infrastructure is typically provided through encryption such as 128 bit encryption. Moreover, all actions taken with respect to the contract (e.g., approval, execution, etc.) occur within the infrastructure and are recorded so that a record can be provided. Any party taking action will first be authenticated before access to the infrastructure is granted. In order for the contract to be electronically executed, both the originating contract partner and the receiving contract partner must first deliberately approve the contract. Once approval has been obtained, the contract can be electronically executed by both parties. After execution is complete, a final image of the contract is generated that includes the electronic signatures and the date of execution.

19 Claims, 22 Drawing Sheets

U.S. PATENT DOCUMENTS

| | | | |
|---|---|---|---|
| 7,069,234 B1 * | 6/2006 | Cornelius et al. | 705/26 |
| 2002/0138731 A1 | 9/2002 | Collamore et al. | |
| 2002/0150241 A1 | 10/2002 | Scheidt et al. | |

FOREIGN PATENT DOCUMENTS

| | | |
|---|---|---|
| JP | PUPA 2002-099843 | 4/2002 |
| JP | PUPA 2003-108725 | 4/2003 |
| JP | PUPA 2003-296192 | 10/2003 |
| WO | 03/021405 A2 | 3/2003 |

* cited by examiner

Details of Contract in Process

Make correction to this contract

| | |
|---|---|
| Contract No.: | C12345808 |
| Transaction description: | Term Lease Supplement for i-Series Servers for ABC Project |
| Contract comments: | Please note: This term-lease supplement needs to be processed by 10/30/2003 to meet ABC project deadline. |
| Version: | 1 |
| Contract Type: | IBM Two-way Total Solution Package |
| Creation Date: | 2003-10-28 |
| Valid Through: | 2003-10-30 |
| Start Date: | 2003-11-10 |
| End Date: | 2004-11-10 |
| Status: | SUBMITTED |
| Last Update: | 2003-10-28 |
| RFP/RFQ No.: | R222450 |
| Master Contr No.: | NAD090 |
| Quote Letter No.: | Q12345V2 |
| PO No.: | |
| Customer Ref.: | |
| Contract Value in USD: | 500000.00 |
| Delivery Type: | Physical offline delivery |
| Contract Category: | Financing Service |
| Industry Sector: | Others |
| Geography: | Americas |

← 102

Contract documents:

Document Name    Document Description
1. ContractPackage1.pdf This document contains a TL supplement, an addendum and a signature page Click here to see document history of this contract
Click here to see execution history of this contract Please put comments here:

This looks good - I approved. -Thao

← 104

Here are the list of actions you can take:
1. ⊙ APPROVE
2. ⊙ DENY
3. ⊙ WITHDRAW

[Submit]

User ID: Thao
Org Name: International Business Machine
- Contracts in Process
- All Contracts in Process
- Create Contract
- Search
- Contracts Online Home
- Log Off

Contracts OnLine

Details of Contract in Process

UserId: Nakan
Org Name: SprintPCS

- Contracts in Process
- All Contracts in Process
- Search
- Contracts OnLine Home
- Log Off

| | |
|---|---|
| Contract No.: | C1234515 |
| Transaction description: | Term-Lease Supp. for Z-series servers for Sprint's Data Center |
| Contract comments: | This supplement is part of the TSP package for Sprint's Data Center |
| Version: | 1 |
| Contract Type: | IBM Two-way Total Solution Package |
| Creation Date: | 2003-11-10 |
| Valid Through: | 2004-11-12 |
| Start Date: | 2003-11-20 |
| End Date: | 2004-05-20 |
| Status: | NEW |
| Last Update: | 2003-11-10 |
| RFP/RFQ No.: | R222452 |
| Master Contr No.: | NAD090 |
| Quote Letter No.: | Q1235V2 |
| PO No.: | |
| Customer Ref.: | |
| Contract Value In USD: | 400000.00 |
| Delivery Type: | Physical offline delivery |
| Contract Category: | Financing Service |
| Industry Sector: | Travel |
| Geography: | Americas |

← 142

Contract documents:

Document Name    Document Description
1. ContractPackage1.pdf  The Contractpackage1 document contains a TL supplement and two addenda Click here to see execution history of this contract Here are the list of actions you can take:
1. ⊙ READY TO SIGN
2. ⊙ I REJECT
3. ⊙ REQUEST FOR CHANGES Please put comments here:

no comments allowed

[Submit]

METHOD, SYSTEM AND PROGRAM PRODUCT FOR ELECTRONICALLY EXECUTING CONTRACTS WITHIN A SECURE COMPUTER INFRASTRUCTURE

FIELD OF THE INVENTION

The present invention generally relates to a method, system and program product for electronically executing contracts within a secure computer infrastructure. Specifically, the present invention provides an improved process for electronically executing contracts within a secured environment.

BACKGROUND OF THE INVENTION

As use of computer networks becomes more pervasive, there is a growing need to provide for the electronic execution/signature of contracts. Electronic execution of contracts can be both more efficient and cost effective than the traditional paper-based approach. One specific type of contract that is amenable to electronic execution is a service agreement (e.g., ServicePac). For example, in purchasing computer hardware, a purchaser may also desire to purchase an associated service agreement. As is well known, these agreements often range over a period of years and can have various pricing schedules.

Unfortunately, many concerns have been raised over electronic contract execution. One such concern is ensuring that electronically executed contracts are legally binding as intended. This can be difficult unless it can be ensured a third party has not fraudulently executed a contract using another party's identity.

One technology widely implemented today is "click and accept" agreements, whereby a computer user is presented with a license agreement or the like on their local machine, and asked simply to click a button if he/she accepts the terms. Although convenient for software licenses, click and accept agreements are grossly inadequate for many higher stakes contracts where further performance is provided, for a long term relationship spanning many years, or where potential liability for the parties is high. For example, with a click and accept agreement, it is usually not necessary to specifically identify the accepting/receiving party. As such, no formal execution (electronic or otherwise) is performed. To this extent, the acceptance or rejection is performed entirely on the receiving party's computer device without subsequent communication with the originating party. Moreover, since a click and accept agreement must be accepted or rejected "as is," there is no process for a receiving party to request changes or modifications to the agreement.

Another technology currently being utilized allows small value contracts (e.g., usually under $100.00) to be electronically executed by both parties via a public web site. Unfortunately, with this current technology, many important safeguards are not provided. For example, since the web site is public, not only is security and confidentiality lacking, but there is also no authentication process. Accordingly, there is no way to ensure that someone electronically executing the contract is actually the party named in the agreement. Moreover, the current technology fails to provide separate deliberate actions on the part of the parties to first approve and then to execute the contract. Providing each party with an opportunity to deliberately indicate their approval of the contract before execution would not only help to provide fairness for both parties, but would also make subsequent repudiation of the contract more difficult.

In view of the foregoing, there exists a need for a method, system and program product for electronically executing contracts within a secure computer infrastructure. Specifically a need exists for a more secure system for electronically executing contracts so that certain core principles, such as authentication of the parties, can be provided. A further need exists for approval and execution of a contract to require separate deliberate actions by the parties.

SUMMARY OF THE INVENTION

In general, the present invention provides a method, system and program product for electronically executing a contract within a secure computer infrastructure. Specifically, under the present invention, a customized contract is created based on the needs of the parties. Once created, the contract is stored within the secure computer infrastructure. Security within the computer infrastructure is typically provided through encryption such as 128 bit encryption. Moreover, all actions taken with respect to the contract (e.g., approval, execution, etc.) occur within the infrastructure and are recorded based on time and date so that a record can be provided. Still yet, any party attempting to access the infrastructure to take action will first be authenticated before such access is granted. In order for the contract to be electronically executed, both the originating contract partner and the receiving contract partner must first deliberately approve the contract. Once approval has been obtained, the contract can be electronically executed by both parties. After execution is complete, a final image of the contract can be generated that includes the electronic signatures and the date of execution. The present invention provides several key advantages over previous systems such as: security; confidentiality; data integrity; data retention; data access; authentication and repudiation prevention.

A first aspect of the present invention provides a method for electronically executing contracts within a secure computer infrastructure, comprising: obtaining contract information from a receiving contract partner; creating a contract within the secure computer infrastructure based on the contract information; requesting approval of the contract within the secure computer infrastructure from an originating contract partner and the receiving contract partner; requesting execution of the contract within the secure computer infrastructure from the receiving contract partner and the originating contract partner after the contract is approved by the originating contract partner and the receiving contract partner; and generating a final image of the contract within the secure computer infrastructure after the contract is executed by the receiving contract partner and the originating contract partner.

A second aspect of the present invention provides a system for electronically executing contracts within a secure computer infrastructure, comprising: a contract creation system for creating a contract within the secure computer infrastructure based on contract information obtained from a receiving contract partner; a contract approval system for requesting and receiving approval determinations for the contract within the secure computer infrastructure from an originating contract partner and the receiving contract partner; a contract execution system for requesting and receiving execution determinations for the contract within the secure computer infrastructure from the receiving contract partner and the originating contract partner after the contract is approved by the originating contract partner and the receiving contract partner; and an image generation system for generating a final image of the contract within the secure computer infrastructure after the contract is executed by the receiving contract partner and the originating contract partner.

A third aspect of the present invention provides a program product stored on a recordable medium for electronically executing contracts within a secure computer infrastructure, which when executed, comprises: program code for creating a contract within the secure computer infrastructure based on contract information obtained from a receiving contract partner; program code for requesting and receiving approval determinations for the contract within the secure computer infrastructure from an originating contract partner and the receiving contract partner; program code for requesting and receiving execution determinations for the contract within the secure computer infrastructure from the receiving contract partner and the originating contract partner after the contract is approved by the originating contract partner and the receiving contract partner; and program code for generating a final image of the contract within the secure computer infrastructure after the contract is executed by the receiving contract partner and the originating contract partner.

Therefore, the present invention provides a method, system and program product for electronically executing a contract within a secure computer infrastructure.

BRIEF DESCRIPTION OF THE DRAWINGS

These and other features of this invention will be more readily understood from the following detailed description of the various aspects of the invention taken in conjunction with the accompanying drawings in which:

FIG. 3 depicts an illustrative interface page containing profile information according to the present invention.

FIG. 4 depicts an illustrative interface page showing a first status of a contract according to the present invention.

FIG. 7 depicts an illustrative interface page for the originating contract partner to approve the contract according to the present invention.

FIG. 8 depicts an illustrative interface page showing a second status of the contract according to the present invention.

FIG. 11 depicts an illustrative interface page for the receiving contract partner to approve the contract according to the present invention.

FIG. 12 depicts an illustrative interface page showing a third status of the contract according to the present invention.

FIG. 15 depicts an illustrative interface page showing a fourth status of the contract according to the present invention.

FIG. 18 depicts an illustrative interface page showing a fifth status of the contract according to the present invention.

FIG. 21 depicts an illustrative interface page showing a sixth status of the contract according to the present invention.

Figure 1:
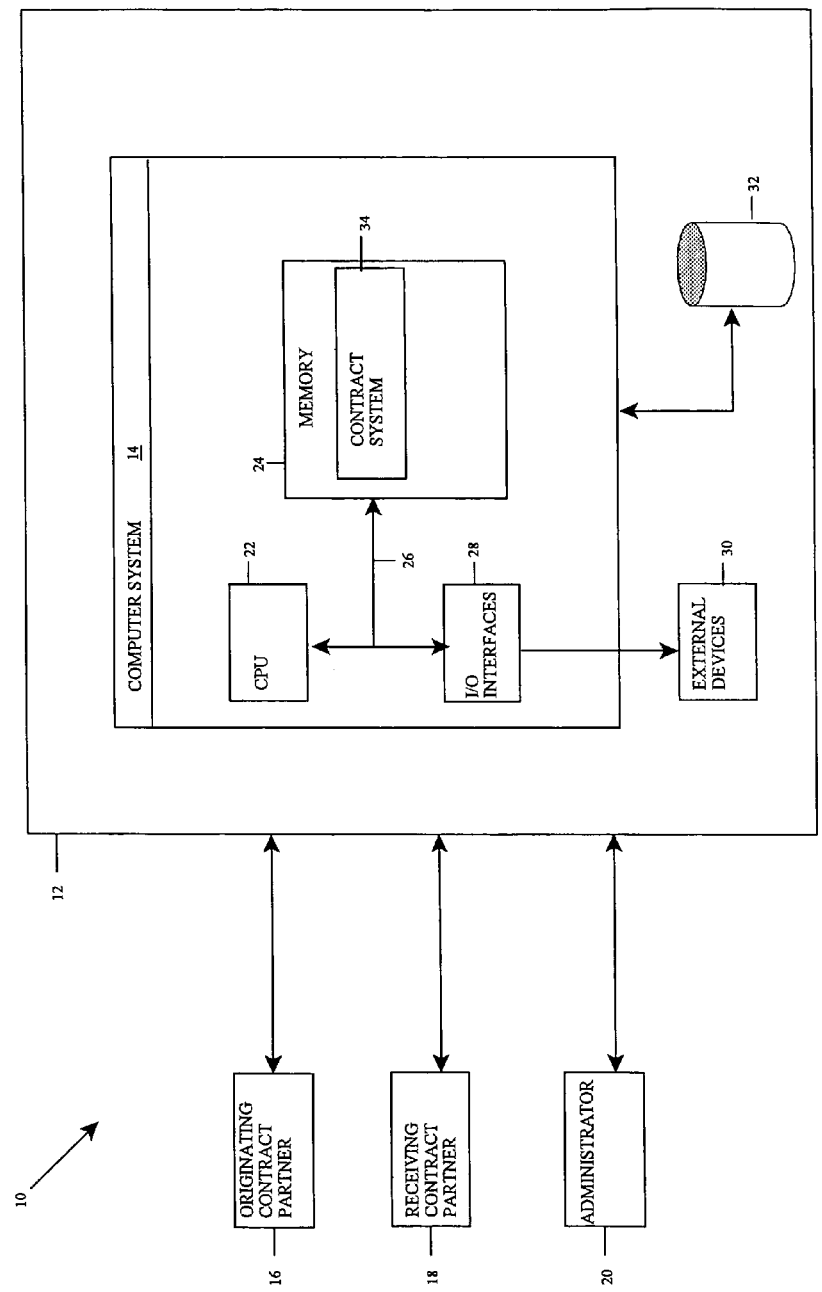
FIG. 1 depicts an illustrative system for electronically executing contracts within a secure computer infrastructure according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sections
I. GENERAL DESCRIPTION
II. DETAILED EXAMPLE

I. GENERAL DESCRIPTION

As indicated above, the present invention provides a method, system and program product for electronically executing a contract within a secure computer infrastructure. Specifically, under the present invention, a customized contract is created based on the needs of the parties. Once created, the contract is stored within the secure computer infrastructure. Security within the computer infrastructure is typically provided through encryption such as 128 bit encryption. Moreover, all actions taken with respect to the contract (e.g., approval, execution, etc.) occur within the infrastructure and are recorded based on time and date so that a record can be provided. Still yet, any party attempting to access the infrastructure to take action will first be authenticated before such access is granted. In order for the contract to be electronically executed, both the originating contract partner and the receiving contract partner must first deliberately approve the contract. Once approval has been obtained, the contract can be electronically executed by both parties. After execution is complete, a final image of the contract can be generated that includes the electronic signatures and the date of execution. The present invention provides several key advantages over previous systems such as: security; confidentiality; data integrity; data retention; data access; authentication and repudiation prevention.

In any event, as used herein, the term "contract" is intended to refer to any legally binding agreement, such as a joint development agreement, a license agreement, a service agreement, etc. To this extent, the term contract includes, but is not limited to agreements that have been negotiated between the parties where one party is performing a service and/or delivering hardware for the other, or delivering. Further, as used herein, the term "originating contract partner" is intended to refer to a party offering a contract to another party, while the term "receiving contract partner" is intended to refer to a party accepting/negotiating a contract from an "originating contract partner."

Referring now to FIG. 1, a system 10 for electronically executing contracts within a secure computer infrastructure (infrastructure) 12 is shown. Infrastructure 12 is intended to represent any type of computer architecture that is maintained in a secure environment (i.e., for which access control is enforced). As shown, infrastructure 12 includes computer system 14 that typically represents a server or the like. It should be understood, however, that although not shown, other hardware and software components (e.g., additional computer systems, routers, firewalls, etc.) could be included in infrastructure 12.

In general, originating contract partner (OCP) 16 and receiving contract partner (RCP) 18 will interface with infrastructure 12 to generate, approve and electronically execute a customized contract. To this extent, OCP 16 and RCP 18 could access infrastructure 12 directly, or over a network via interfaces (e.g., web browsers) loaded on computerized devices (e.g., personal computers, laptops, handheld devices, etc. not shown in FIG. 1). In the case of the latter, the network can be any type of network such as the Internet, a local area network (LAN), a wide area network (WAN), a virtual private network (VPN), etc. In any event, communication with infrastructure 12 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, OCP 16 and RCP 18 could utilize an Internet service provider to establish connectivity to infrastructure 12.

It should be understood that under the present invention, infrastructure 12 could be owned and/or operated by a party such as OCP 16, or by an independent entity. In the case of the former, OCP 16 would use infrastructure 12 to form contracts with outside parties such as RCP 18. In the case of the latter, infrastructure 12 could be used independently by OCP 16 and RCP 18 to form a contract. To this extent, infrastructure 12 could be offered to parties on a fee-basis. In either scenario, administrator 20 could support and configure infrastructure 12.

Regardless, as further shown, computer system 14 generally comprises central processing unit (CPU) 22, memory 24, bus 26, input/output (I/O) interfaces 28, external devices/resources 30 and storage unit 32. CPU 22 may comprise a single processing unit, or be distributed across one or more processing units in one or more locations, e.g., on a client and computer system. Memory 24 may comprise any known type of data storage and/or transmission media, including magnetic media, optical media, random access memory (RAM), read-only memory (ROM), a data cache, etc. Moreover, similar to CPU 22, memory 24 may reside at a single physical location, comprising one or more types of data storage, or be distributed across a plurality of physical systems in various forms.

I/O interfaces 28 may comprise any system for exchanging information to/from an external source. External devices/resources 30 may comprise any known type of external device, including speakers, a CRT, LCD screen, handheld device, keyboard, mouse, voice recognition system, speech output system, printer, monitor/display, facsimile, pager, etc. Bus 26 provides a communication link between each of the components in computer system 14 and likewise may comprise any known type of transmission link, including electrical, optical, wireless, etc.

Storage unit 32 can be any system (e.g., database) capable of providing storage for information under the present invention. Such information could include, for example, contracts, activity histories, etc. As such, storage unit 32 could include one or more storage devices, such as a magnetic disk drive or an optical disk drive. In another embodiment, storage unit 32 includes data distributed across, for example, a local area network (LAN), wide area network (WAN) or a storage area network (SAN) (not shown). Although not shown, additional components, such as cache memory, communication systems, system software, etc., may be incorporated into computer system 14. In addition, it should also be appreciated that although not shown, any computerized devices operated by OCP 16 and RCP 18 would likely include computerized components similar to computer system 14.

Shown in memory 24 of computer system 14 is contract system 34. Under the present invention, contract system 34 allows for the customized creation, approval and electronic execution of a contract within infrastructure 12. Specifically, as will be further described below, contract system 34 provides several key protocols/advantages not previously recognized. For example, under the present invention: (1) security is maintained (e.g., typically through 128 bit encryption); (2) confidentiality is maintained so that only appropriate parties can view data and contracts; (3) data integrity is maintained so that corruption does not occur; (4) data retention is provided so that the parties can later view the contract and its surrounding activity; (5) authentication is required so that only authorized parties can access the infrastructure 12 and pertinent contracts; (6) non-repudiation is provided by ensuring that the party executing the contract is the actual party and not a fraudulent user; and (7) data access is provided so that appropriate parties can view data relating to the contract process.

Figure 2:
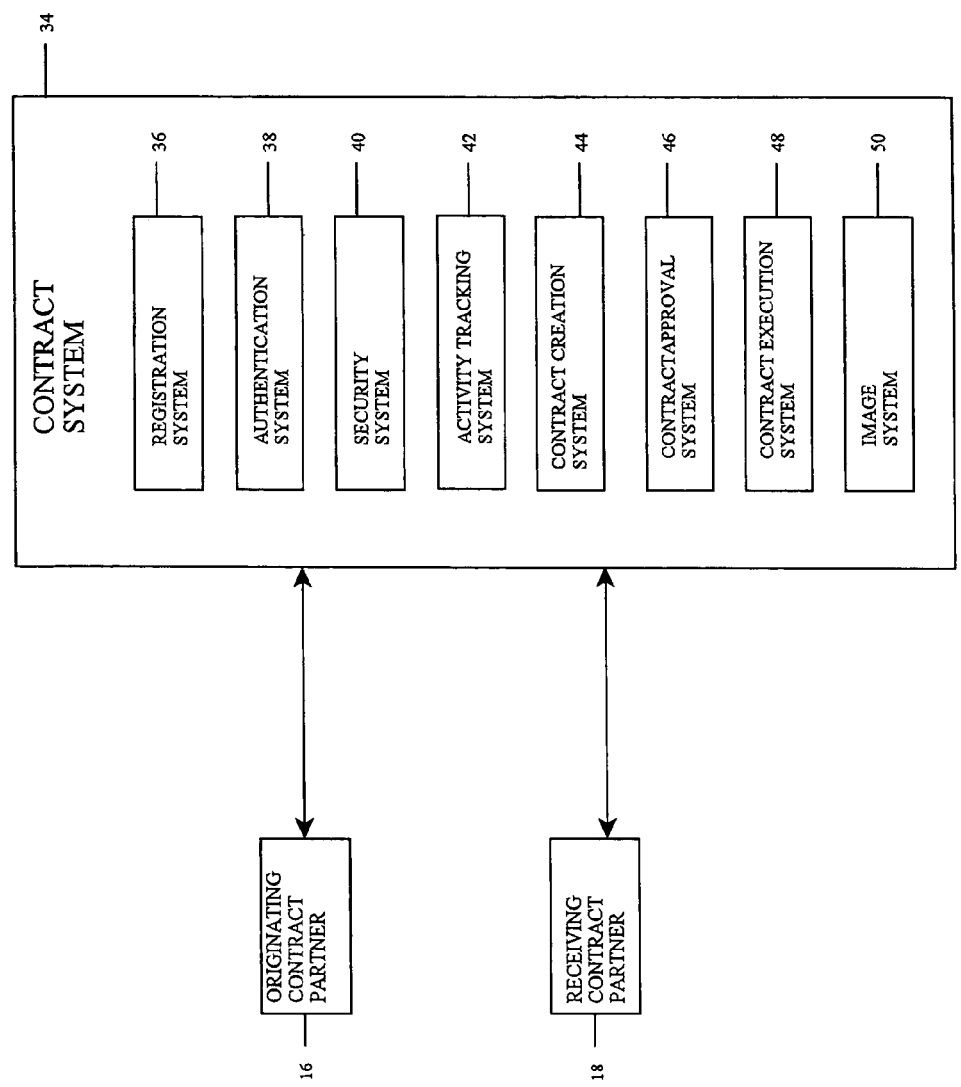
FIG. 2 depicts the contract system of FIG. 1 in greater detail.

Referring now to FIG. 2, contract system 34 is shown in greater detail. As depicted, contract system 34 includes registration system 36, authentication system 38, security system 40, activity tracking system 42, contract creation system 44, contract approval system 46, contract execution system 48 and image system 50. Each of these systems represents program code that performs the function described below. In performing these function, the systems within contract system 34 will likely generate any necessary interface pages and/or notifications that are used to electronically generate, approve- and execute a contract under the present invention.

The functions of each of these systems will be further described below, but in general, registration system 36 will be used to first register the parties. In the case where infrastructure 12 is owned/operated by OCP 16, only registration of RCP 18 might be necessary. In general, registration of a party entails obtaining profile information such as contact information. Registration is also used so that parties can be later authenticated when attempting to access infrastructure 12. In addition, once profile information is obtained, registration system 36 can communicate with other external systems (not shown) to perform a credit check or the like on a registering party. Authentication system 38 ensures that only authorized parties can access infrastructure 12. Typically this is done based on login information such as a user name and password. Security system 40 provides security for infrastructure 12 against hackers and the like. This is typically accomplished using 128 bit encryption or other similar method. Activity tracking system 42 is used to track all activity occurring within infrastructure 12 (e.g., based on date and time as well as an IP address of the users performing the actions). For example, when a contract is created, an entry will be made in storage unit 24 or the like. Similarly, as OCP 16 and RCP 18 approve and execute the contract, an entry will be made in storage unit 32. This allows a complete history of activity to be easily viewed. Contract creation system 44 will create a customized contract for OCP 16 and RCP 18 based on the needs thereof. Contract approval system 46 will coordinate the approval of the contract by OCP 16 and RCP 18. Once the contract is approved, contract execution system 48 will coordinate the execution of the contract by OCP 16 and RCP 18. After the contract is executed, image system 50 will generate a final image of the contract for the parties.

II. DETAILED EXAMPLE

The functions of the present invention will be further described below. For the remainder of this disclosure, assume as an illustrative example that infrastructure 12 is owned/operated by OCP 16 from whom RCP 18 wishes to purchase a service contract. In this scenario, RCP 18 will first be registered as described above. As part of the registration process, an electronic notification (e.g., an e-mail) will be communicated to RCP 18. The electronic notification will likely include a link such as a URL, which upon selection by RCP 18, will provide initial access to infrastructure 12. Once this initial access is provided, authentication system 38 will provide RCP 18 with a user name and password (which can be changed by RCP 18) for subsequent access of infrastructure 12.

Figure 3:
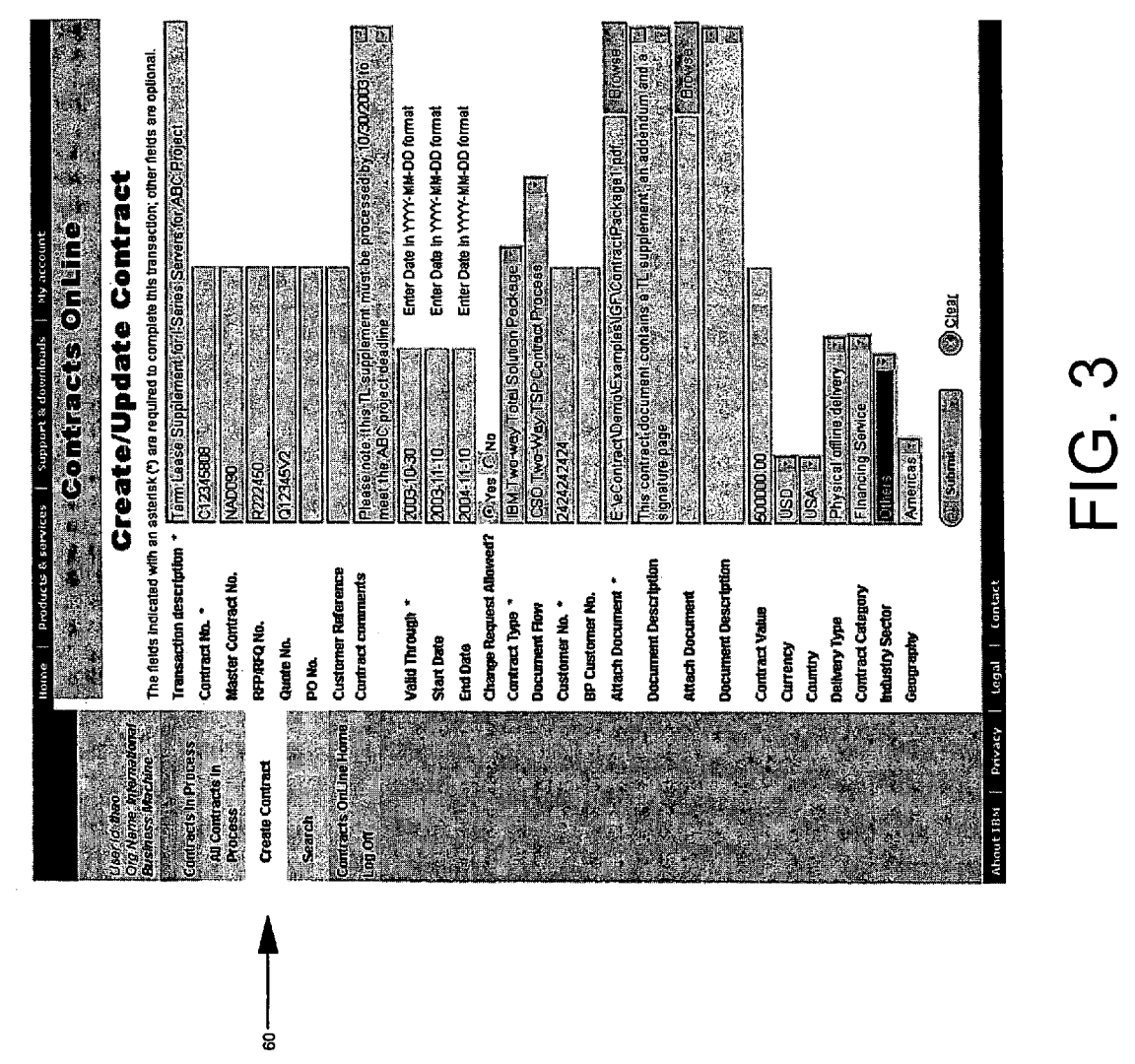

After RCP 18 has been registered, OCP 16 will communicate therewith to obtain RCP 18's contract requirements/information. For example, RCP 18 might be seeking a service contract covering certain pieces of hardware, for a certain length, and for a certain price. This contract information can be collected manually by OCP 16 (or a representative thereof), or electronically via e-mail or the like. In any event, the contract information can be populated into an interface page 60 such as shown in FIG. 3. From the information contained within interface page 60, a new contract can be customized. Specifically, using the contract information in interface page 60, contract creation system 44 (FIG. 2) will generate a new contract. Because the contract is based on the individual needs of the parties, it is considered to be a customized contract, as opposed to a boilerplate agreement such as a "click and accept" agreement.

Figure 4:
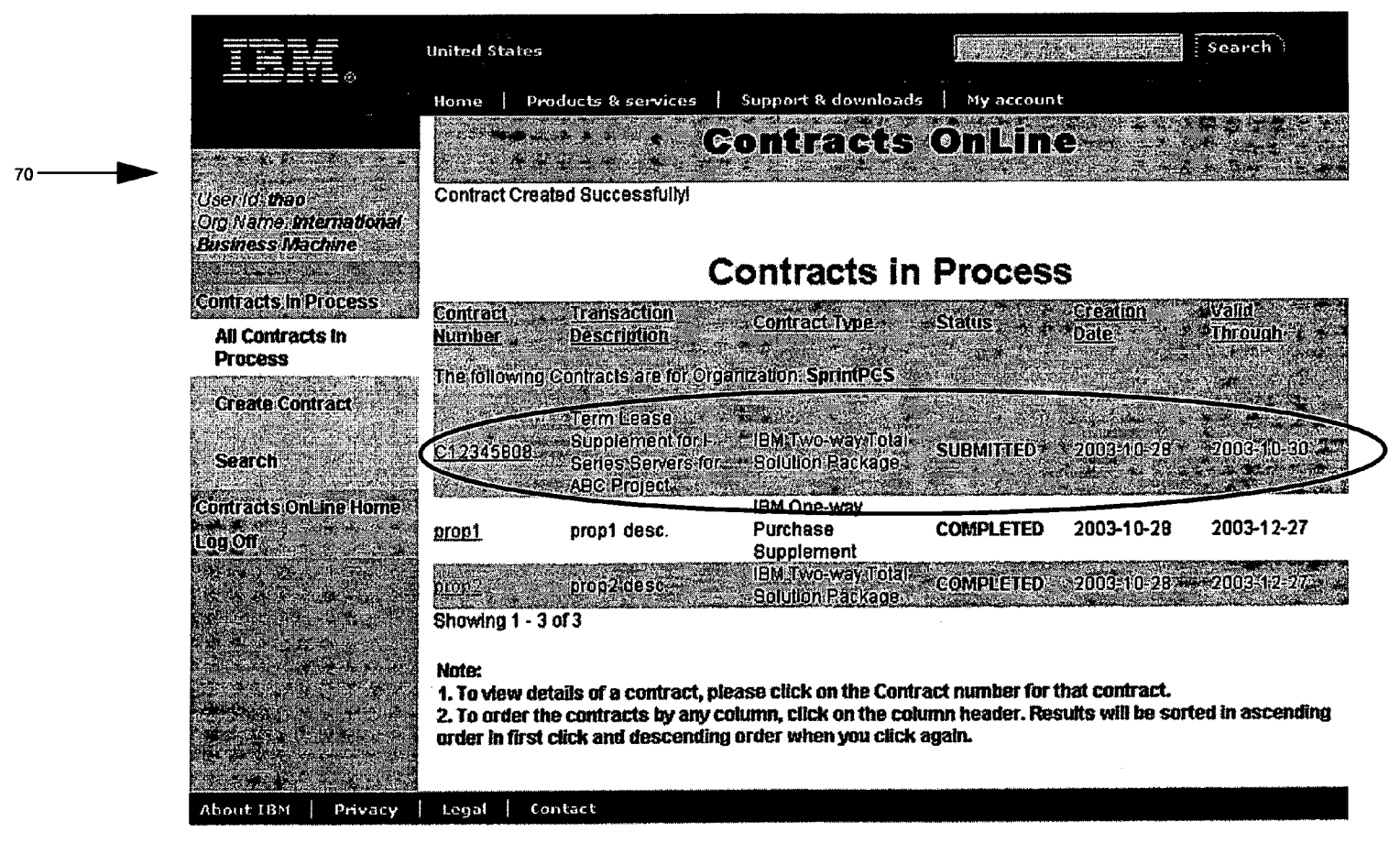

Once the contract has been created, activity tracking system 42 (FIG. 2) will log the generation of the contract based on date and time in storage unit 32. In addition, the contract will be assigned an initial status of "Submitted" (e.g., by contract creation system 44). Referring to FIG. 4, this is shown in greater detail. As depicted, FIG. 4 shows an interface page 70 depicting the status of three different contracts. The first contract (encircled) has been given the status of "Submitted" meaning that is has been created but not yet approved. FIG. 4 shows three contracts to illustrate that a single party can use infrastructure and contract system 34 to reach multiple contracts at once. In this case, not all need be with the same opposing party. For example, assume that FIG. 4 shows the three contracts OCP 16 has with other parties. One contract could be the one pending with RCP 18, while the other two could be those pending with two other RCPs. To this extent, each party could have its own "room" within infrastructure 12 that contains all of its pending contracts. Only that party could have permission to access its room. This model could be extended to individuals or departments within a single organization. For example, each department could have its own room that cannot be accessed by other departments.

Figure 5:
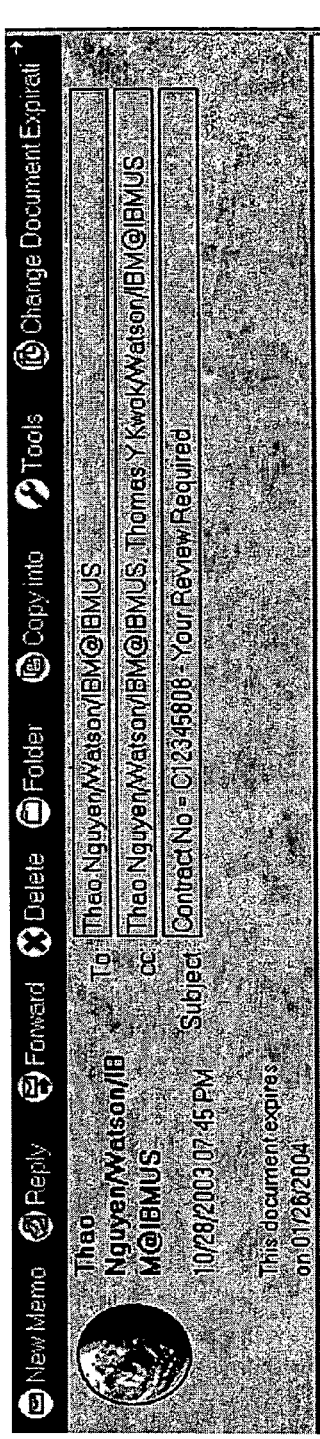
FIG. 5 depicts an approval notice for an originating contract partner according to the present invention.
Figure 6:
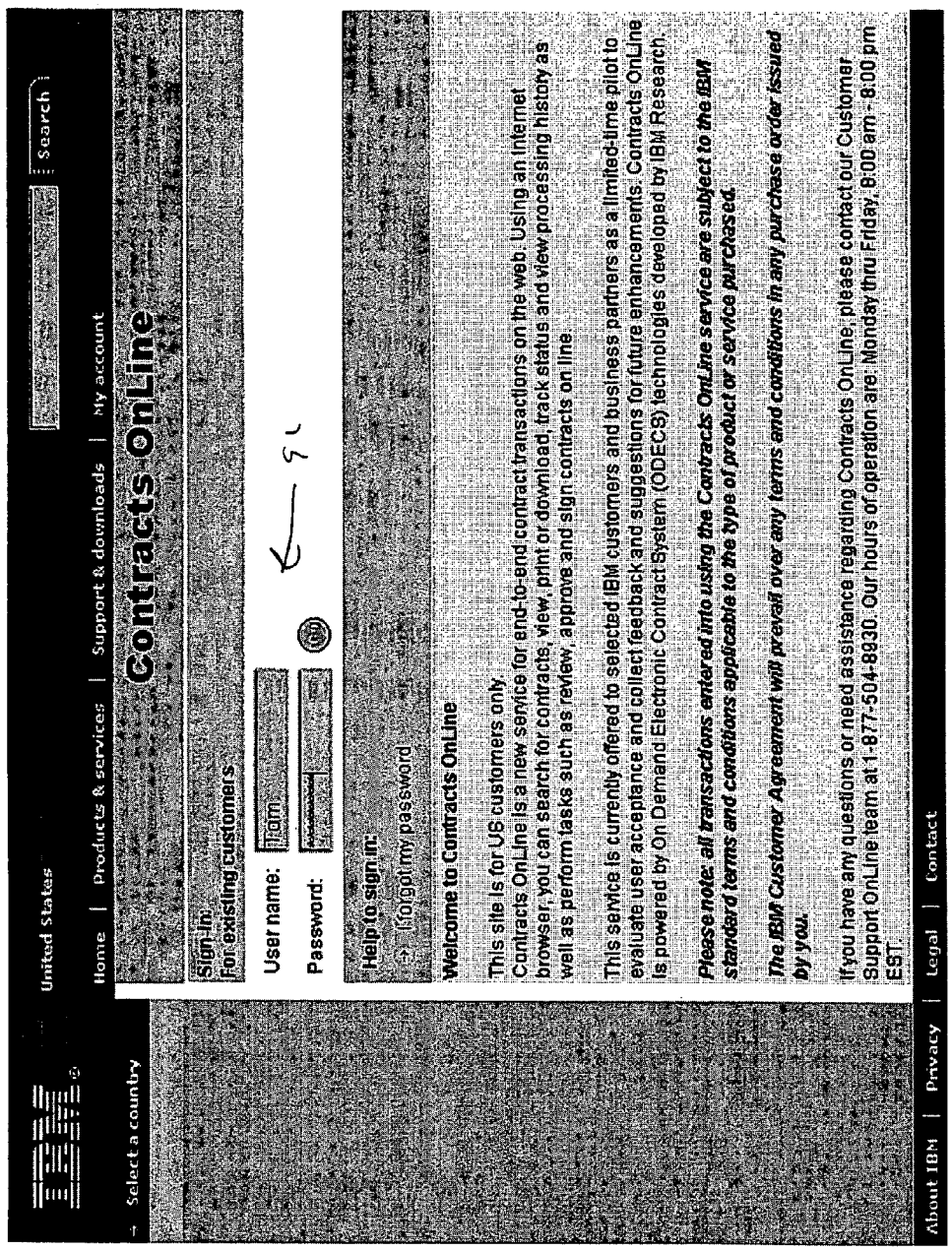
FIG. 6 depicts an illustrative login page displayed upon selection of a link in the approval notice of FIG. 5 according to the present invention.

Regardless, once the contract has been generated, contract approval system 46 (FIG. 2) will generate and send an electronic approval notification (e.g., e-mail) to OCP 16. FIG. 5 depicts an illustrative approval notification 80 for OCP 16. As depicted, approval notification 80 includes a link 82. Upon selection of link 82, OCP 16 will be brought to a login page to log into infrastructure 12. FIG. 6 depicts an illustrative login page 90. As shown, login page 90 prompts OCP 16 for login information 92 such a user name and password. Upon being submitted, authentication system 38 will attempt to authenticate the information. If successful, contract approval system 46 (FIG. 2) will display an interface page for OCP 16 to approve the contract. To this extent, link 82 can be considered to be a "smart link" that sends OCP 16 directly to the contract to be approved once authentication is successful.

Referring to FIG. 7, an illustrative such interface page 100 is shown. As depicted, interface page 100 not only includes biographical information 102 about the contract and activity related thereto, but also a mechanism 104 for OCP 16 to input comments as well as to approve, deny (e.g., seek changes) or have the contract withdrawn completely. In approving the contract, it should be understood that one or more individuals within OCP 16 could be required to act in this manner.

Figure 8:
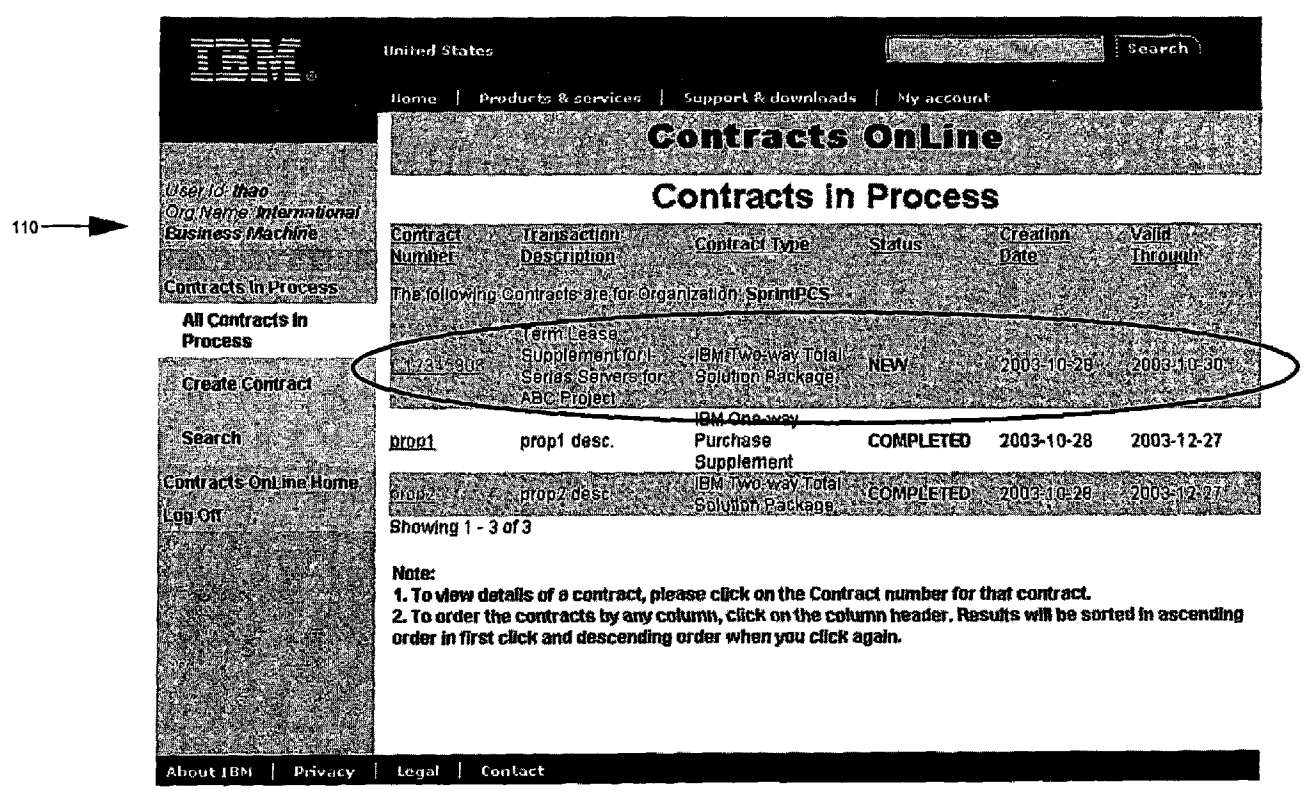
Figure 9:
FIG. 9 depicts an illustrative approval message for a receiving contract partner according to the present invention.
Figure 10:
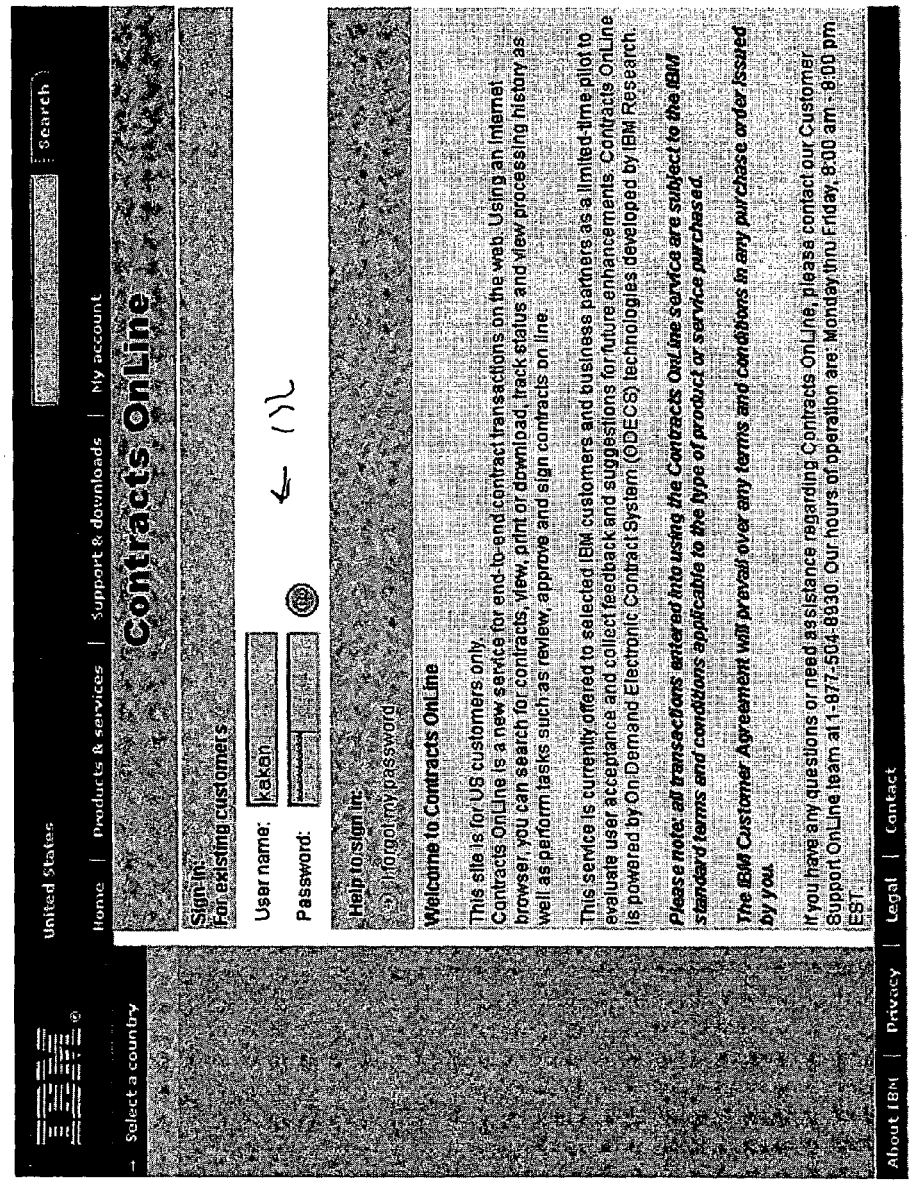
FIG. 10 depicts an illustrative login page displayed upon selection of a link in the approval notice of FIG. 9 according to the present invention.

Once OCP 16 approves the contract, the status thereof will be changed to "New" by contract approval system 46 (FIG. 2) as demonstrated in interface page 110 of FIG. 8. Thereafter, contract approval system 46 (FIG. 2) will communicate an electronic approval notification to RCP 18. As shown in FIG. 9, approval notification 120 for RCP 18 is similar to approval notification 80 for OCP 16 of FIG. 5. In any event, upon selecting (smart) link 122 in approval notification 120, RCP will arrive at a login page 130 (FIG. 10) for inputting login information 132. Once submitted, authentication system 38 (FIG. 2) will attempt to authenticate RCP 18's login information. If successful, the "smart" link 122 will bring RCP 18 directly to the contract for approval. To this extent, FIG. 11 shows an illustrative interface page 140 that RCP 18 will be presented for approving the contract. Similar to interface page 100 (FIG. 7) presented to OCP 16, interface page 140 contains biographical information 142 as well as a mechanism 144 for RCP 18 to input comments and to indicate the contract is ready to sign, to reject the contract, or to request changes to the contract.

If RCP 18 requests changes to the contract, RCP 18 will be provided with an interface page or the like to create an issue list that denotes RCP 18's objections to the contract. OCP 16 can then create new version(s) of the contract based on the issue list. All versions of the contract as well as the surrounding activities will be maintained by the system.

Figure 12:
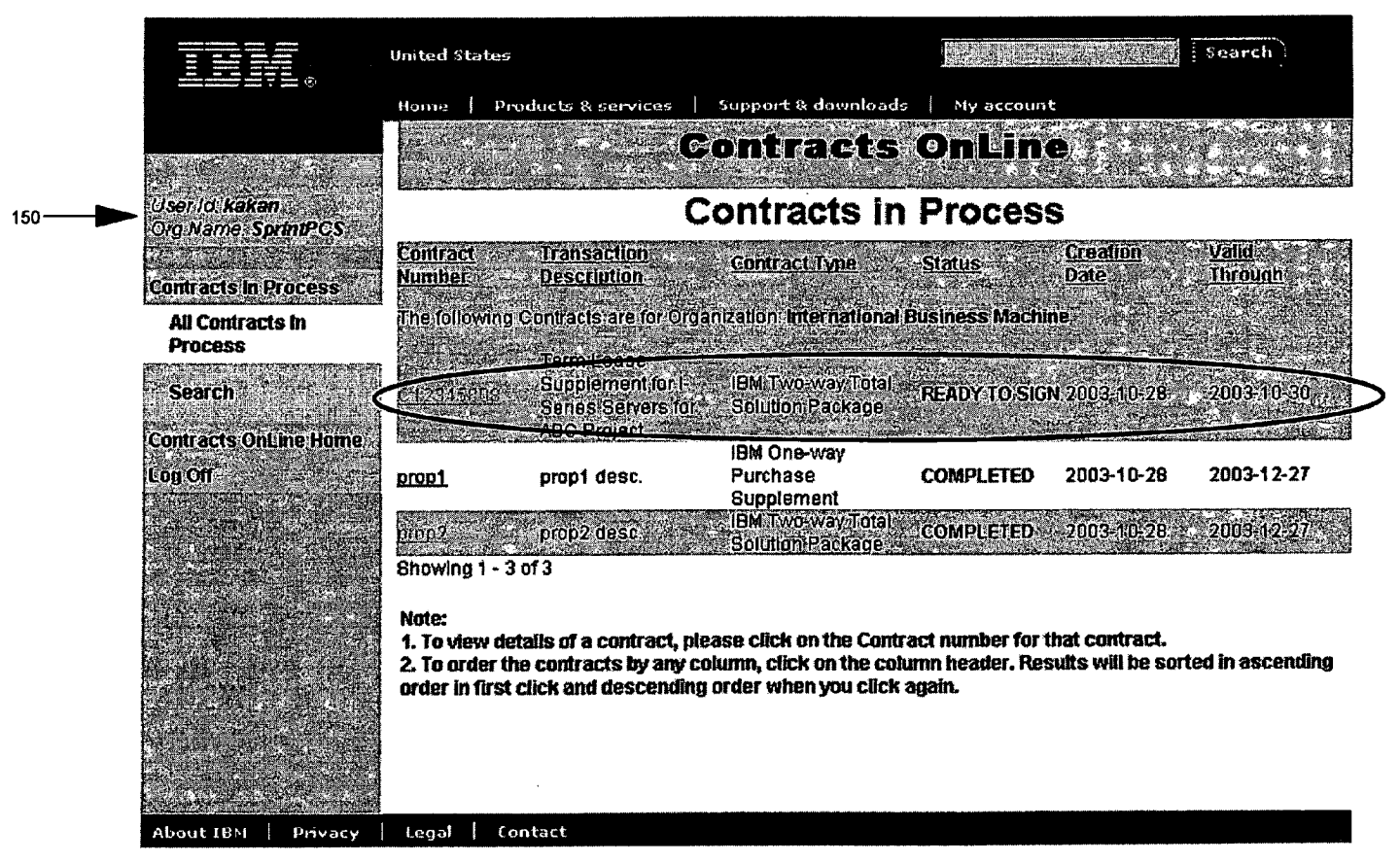
Figure 13:
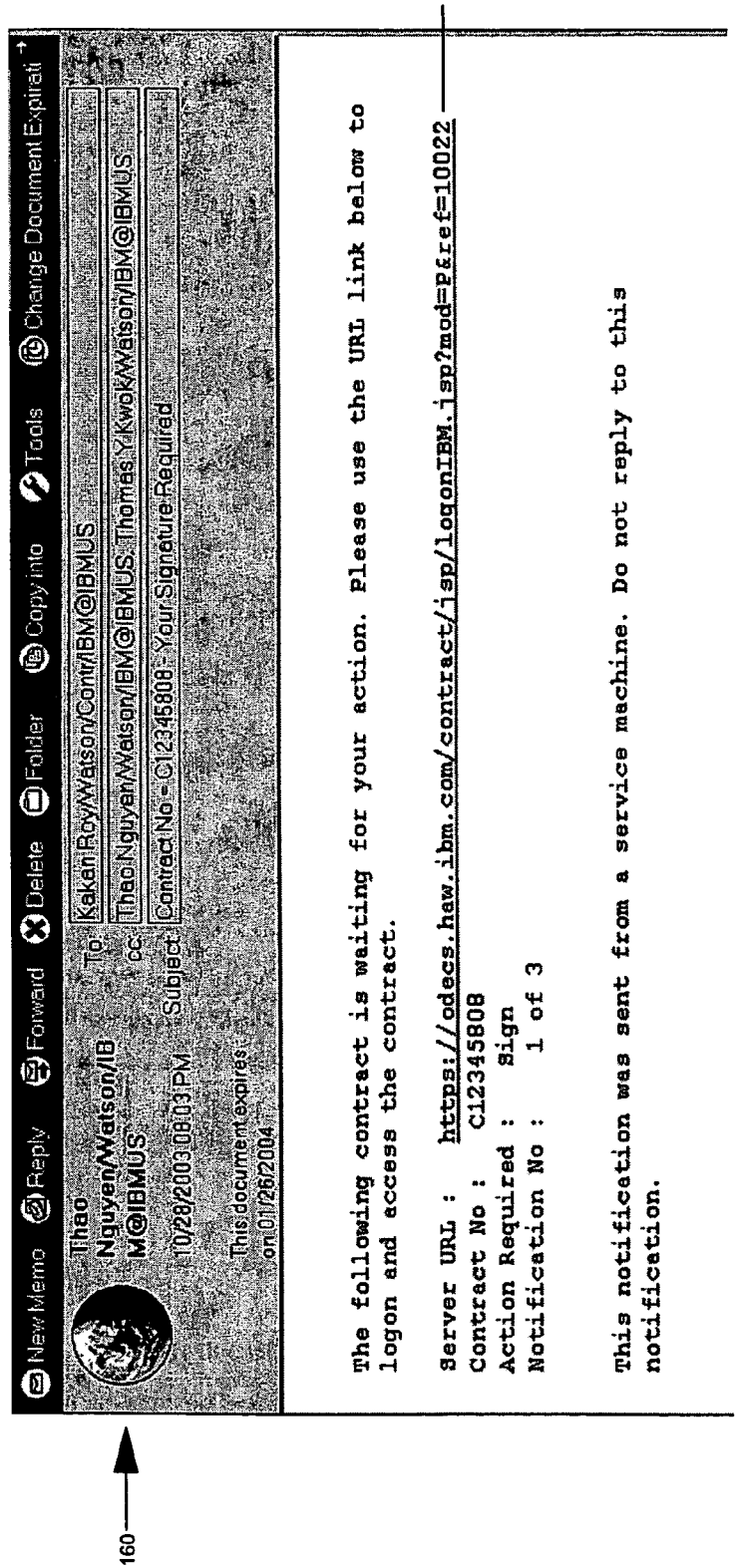
FIG. 13 depicts an illustrative execution message for a receiving contract partner according to the present invention.
Figure 14:
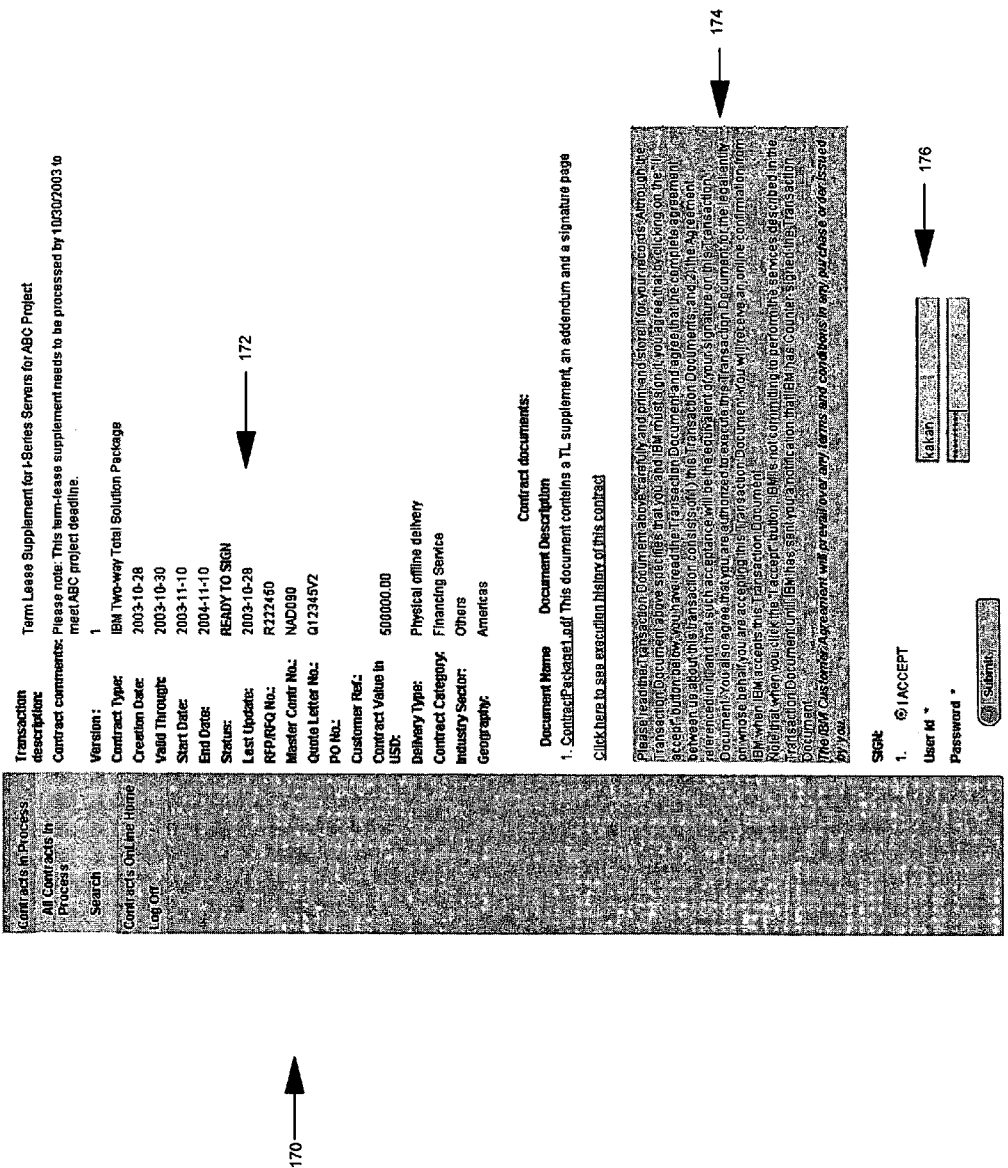
FIG. 14 depicts an illustrative interface page for the receiving contract partner to execute the contract according to the present invention.

Alternatively, if RCP 18 approves of the contract (indicates it is ready to sign), the status will be changed by contract approval system 46 (FIG. 2) to "Ready to Sign." In a typical embodiment, if RCP 18 indicates the contract is "Ready to Sign," any comments input by RCP 18 can be blocked out. This helps prevent subsequent repudiation or dispute. In any event, FIG. 12 depicts an interface page 150 showing this new status. At this point contract approval system 48 (FIG. 2) can begin the process of having OCP 16 and RCP 18 execute the contract. In typical embodiment, RCP 18 will be solicited for execution first (although this need not be the case). Accordingly, FIG. 13 depicts an illustrative execution notification 160 that will be communicated to RCP 18. Similar to the approval notification, execution notification 160 includes a (smart) link 162, which upon selection by RCP 18, will direct RCP 18 to a login page (e.g., FIG. 10). Similar to the approval process, RCP 18's login information will first be authenticated. Thereafter, as shown in FIG. 14, RCP 18 will be presented with an interface page 170 for approving the contract. As depicted, interface page 170 includes biographical information 172 and mechanism 176 to accept/execute the contract. Interface page 170 can also include a legal notice 174 or the like.

Figure 15:
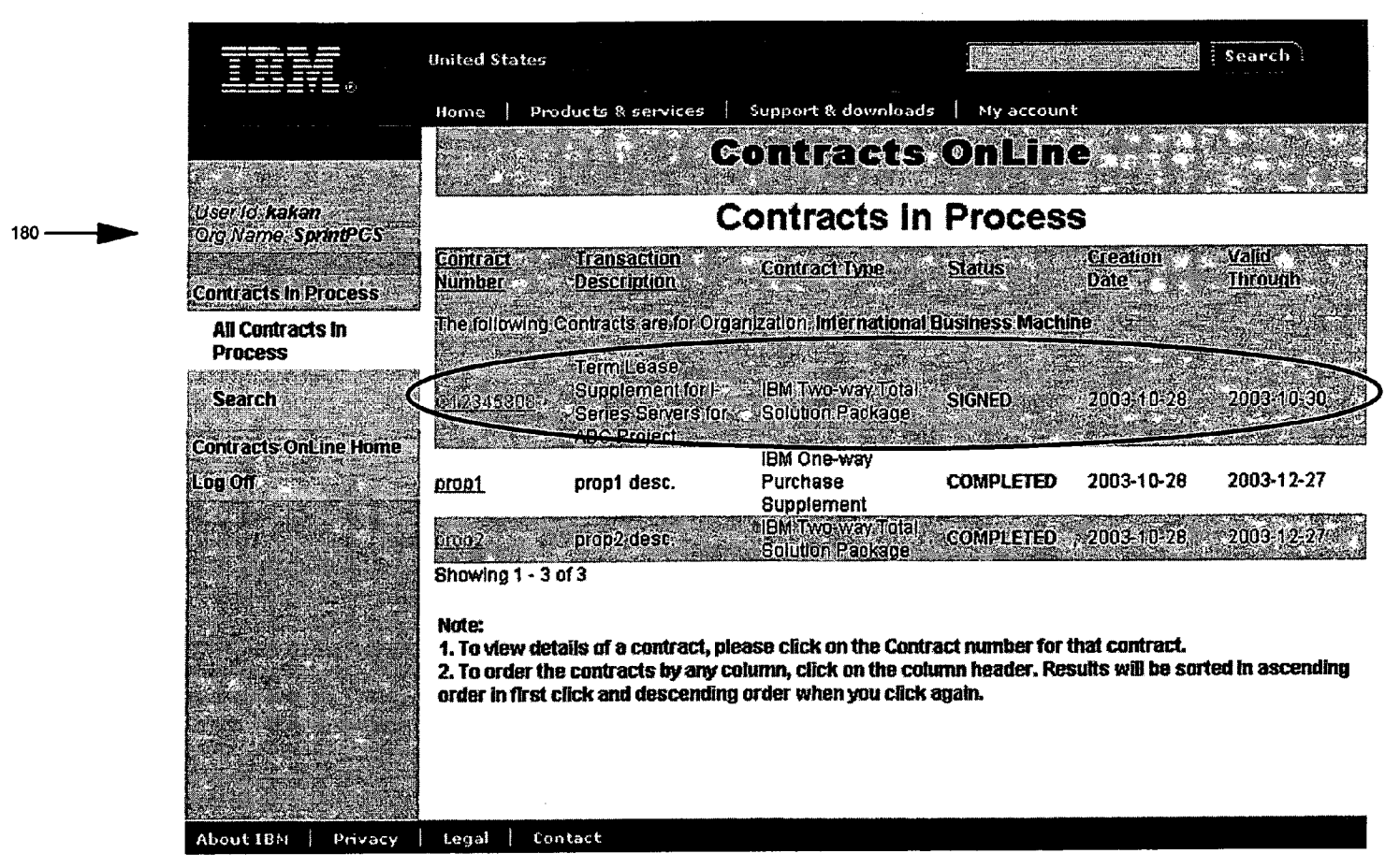
Figure 16:
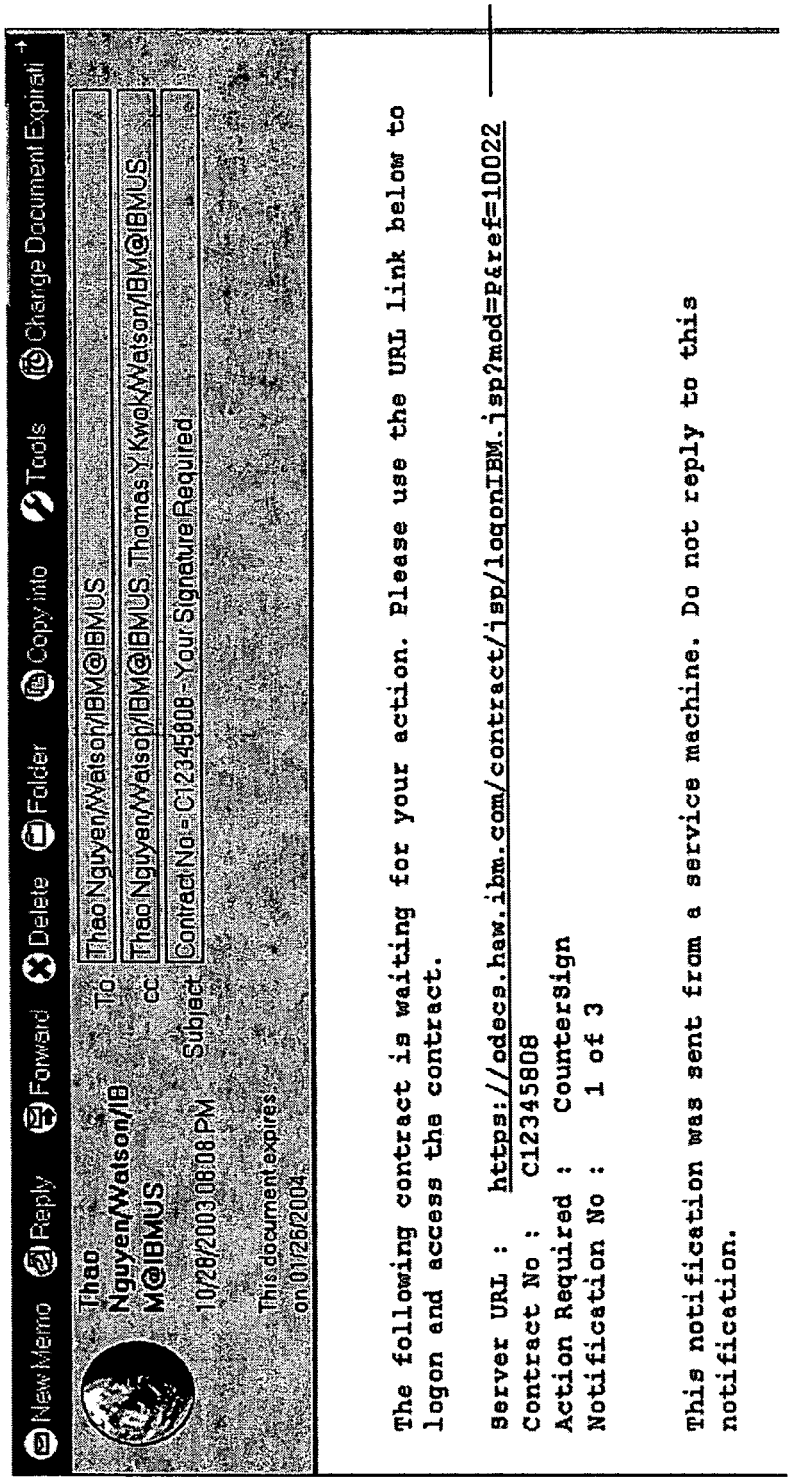
FIG. 16 depicts an illustrative execution message for an originating contract partner according to the present invention.
Figure 17:
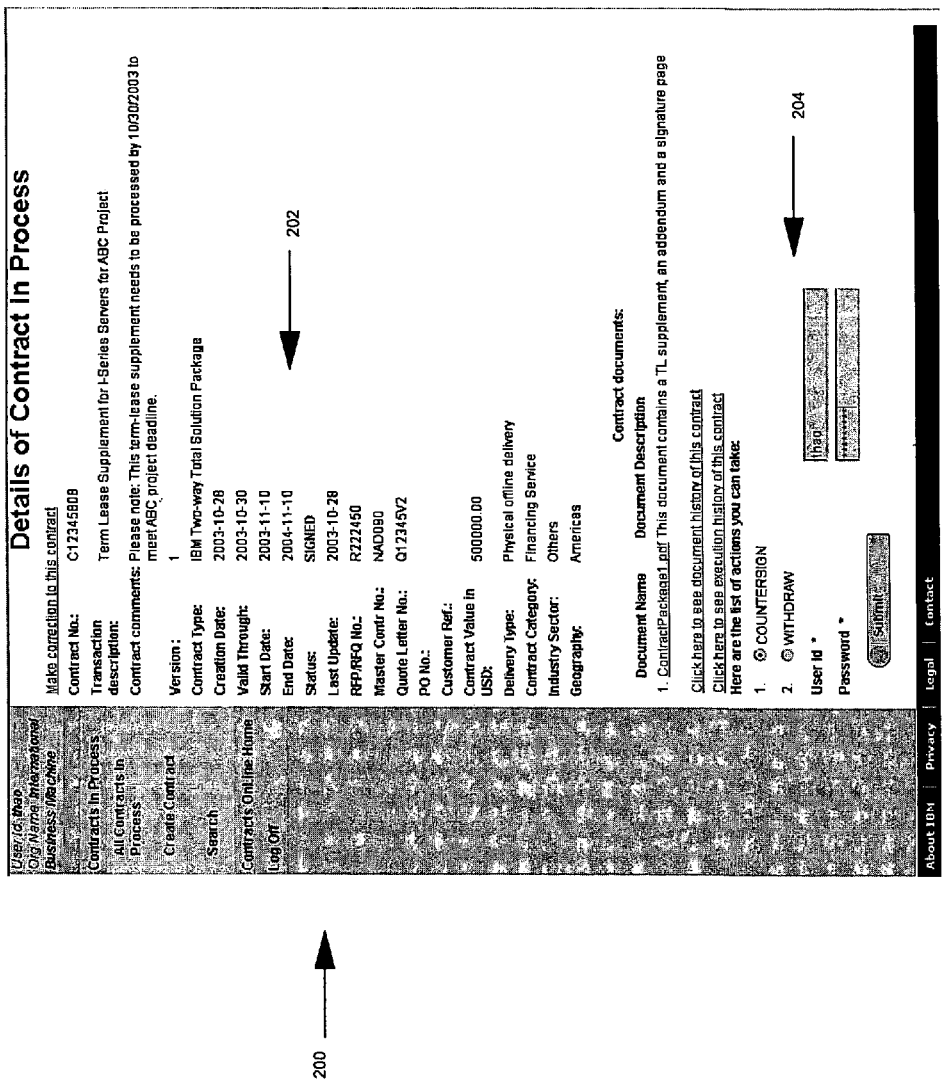
FIG. 17 depicts an illustrative interface page for the originating contract partner to execute the contract according to the present invention.
Figure 18:
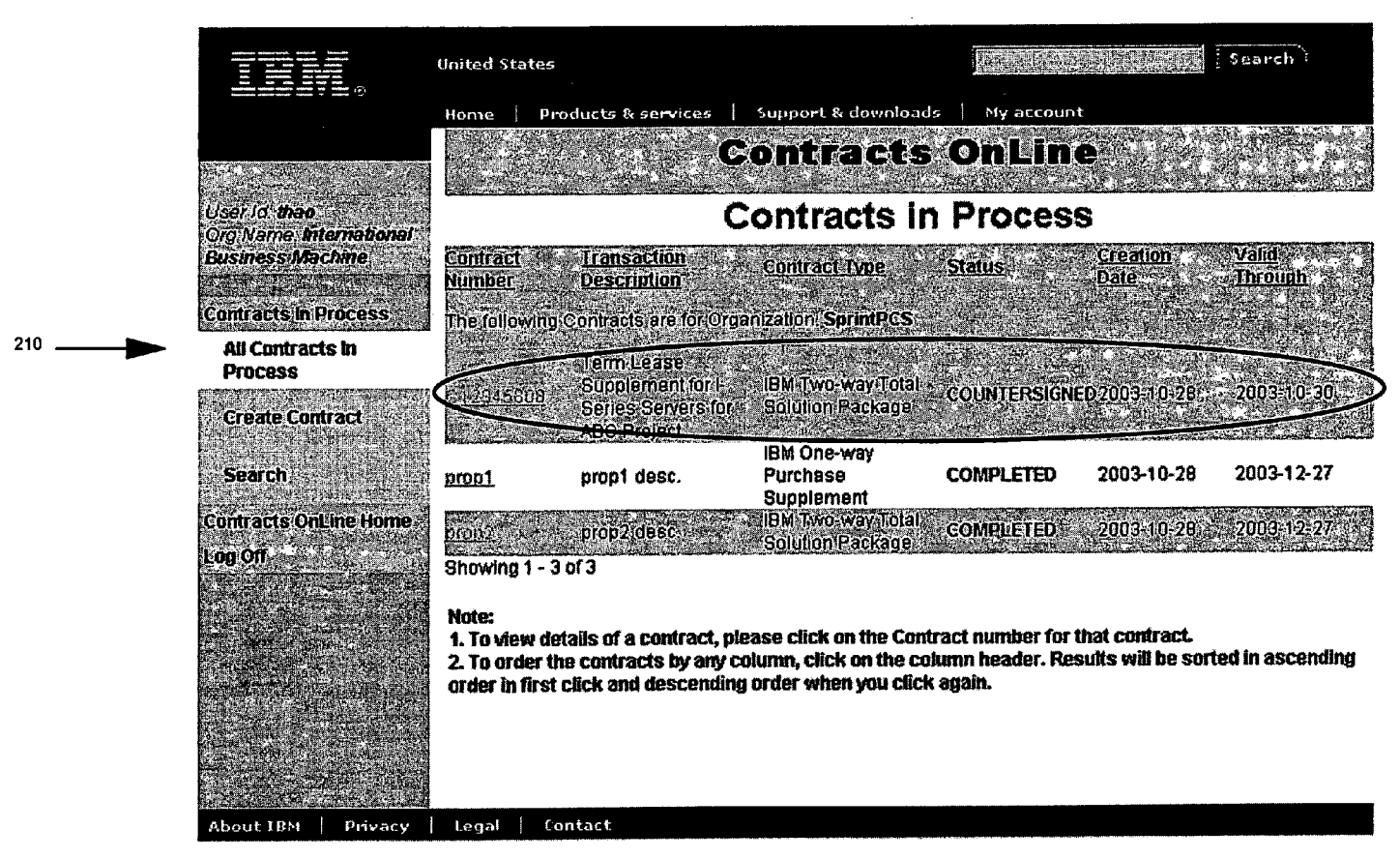

Once RCP 18 executes the contract, contract execution system 48 (FIG. 2) will change the status thereof to "Signed," as indicated in the interface page 180 of FIG. 15. Then, execution by OCP 16 can be solicited in a similar manner. Specifically, an electronic execution notification 190 (FIG. 16) will be communicated thereto. Similar to the approval notification, execution notification 190 can include a (smart) link 192 to a login page. Once the login information for OCP 16 has been authenticated, an interface page 200 such as that shown in FIG. 17 can be provided. As shown, interface page 200 includes biographical information 202 and a mechanism 204 for OCP 16 to accept/execute the contract or withdraw it completely. It should be noted that the execution pages 170 (FIG. 14) and 200 both include another prompt for RCP 18 and OCP 16 to input login information. This provides yet another opportunity to authenticate each party and ensure that the individual making the selections is in fact authorized to do so. In any event, once OCP 16 has executed the contract, the status thereof will be changed by contract execution system 48 (FIG. 2) to "Countersigned" as shown in interface page 210 of FIG. 18.

Figure 19:
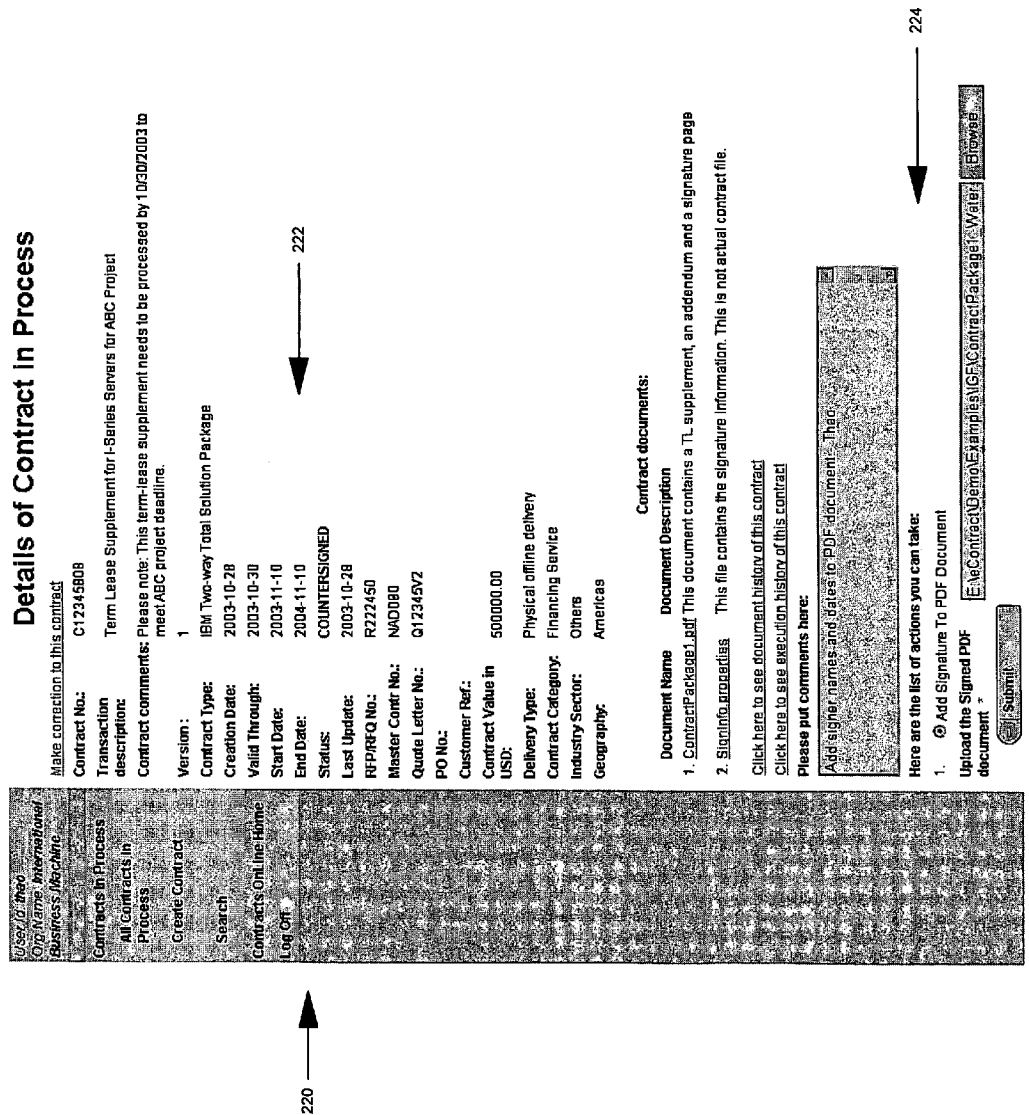
FIG. 19 depicts an illustrative interface page for an image of the executed contract to be generated according to the present invention.
Figure 20:
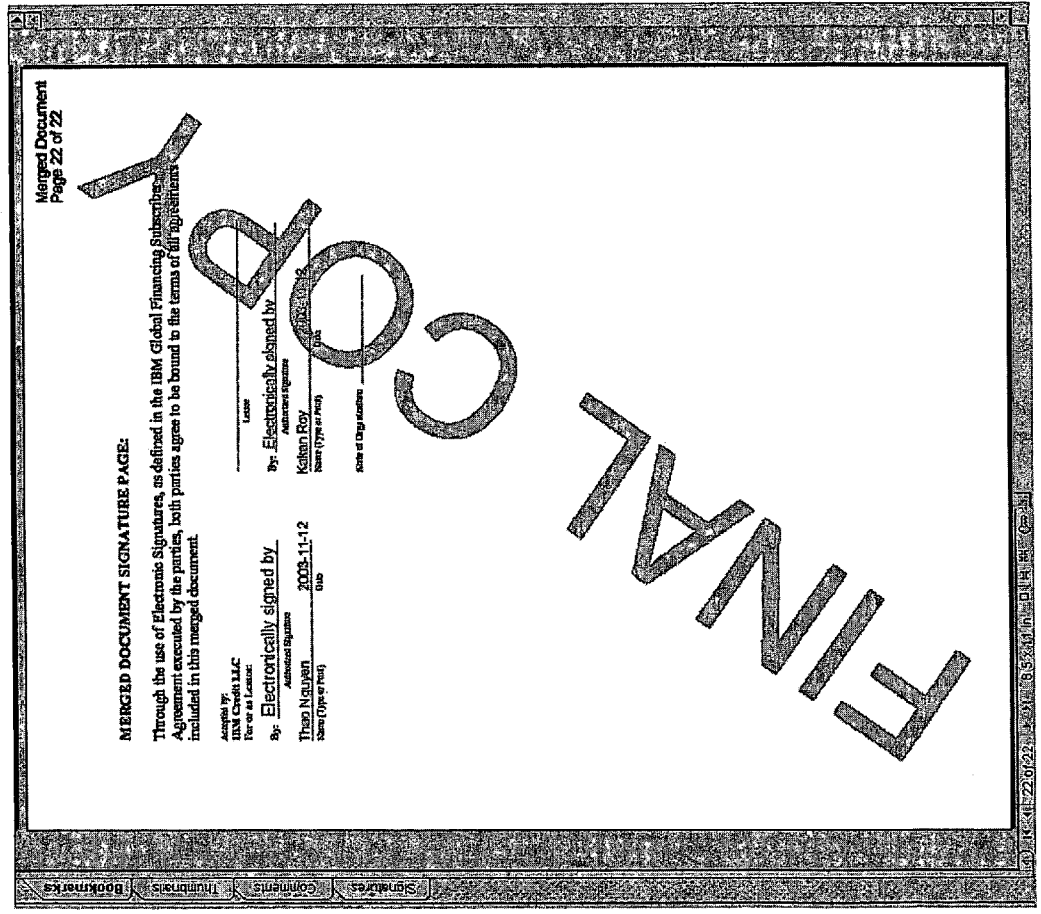
FIG. 20 depicts an illustrative final image of the contract, according to the present invention.
Figure 21:
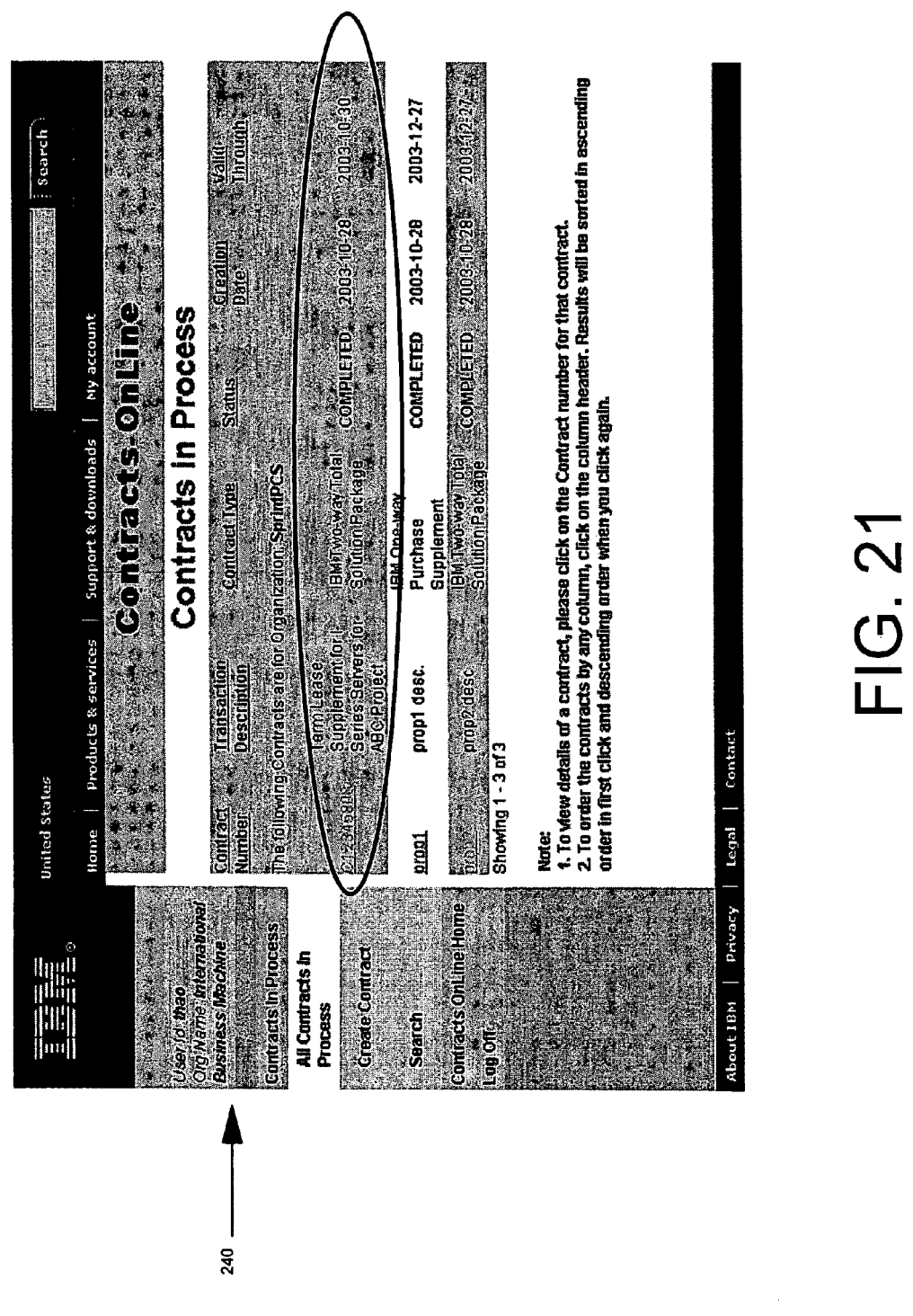

At this point, OCP 16 can be prompted by image system 50 (FIG. 2) via notification or the like to have a final image of the contract generated. To this extent, once OCP 16 logs in and is authenticated, an interface page such as 220 of FIG. 19 can be provided. As shown, interface page 220 include biographical information 222 as well as a mechanism 224 for OCP 16 to add the electronic signatures to the contract. Once this is done, a final image of the contract is generated. Referring to FIG. 20, an illustrative final image 230 is shown. As depicted, final image 230 includes the electronic signatures of OCP 16 and RCP 18 as well the corresponding date stamps of execution. At this point, as shown in the interface page 240 of FIG. 21, the status of the contract will be changed to "Complete."

Figure 22:
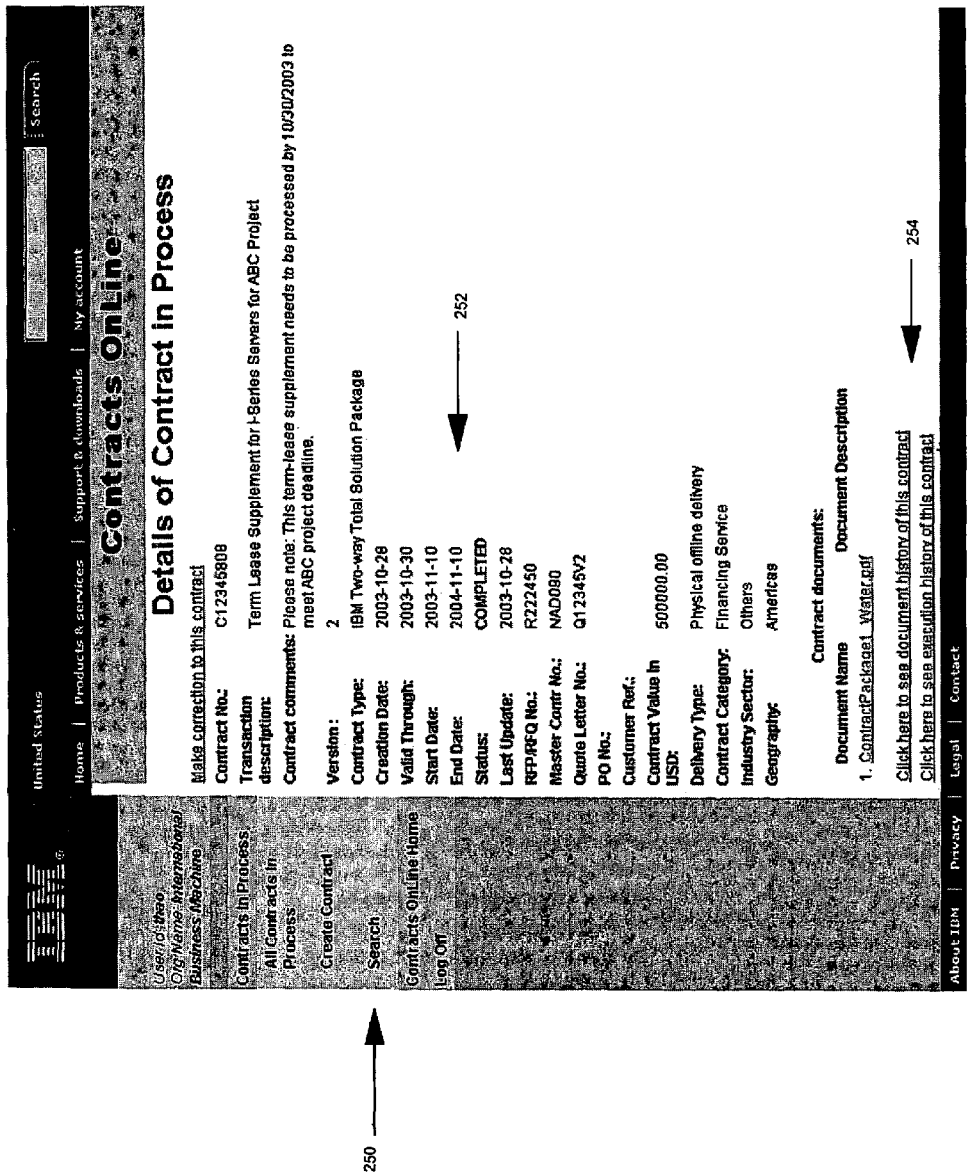
FIG. 22 depicts an illustrative interface page for viewing contract details according to the present invention.

Because activity tracking system 42 (FIG. 2) recorded all activity surrounding the contract, either party can log into the system to view the details. For example, referring to FIG. 22, an illustrative interface page 250 for viewing the contract details is shown. Interface page 250 not only sets forth some biographical information 252, but also has a mechanism 254 for a party to view a document history of the contract, or an execution history of the contract. As indicated above, activity tracking system 42 could also track the IP addresses of OCP 16 and RCP 18 as the actions are performed. This also helps prevent repudiation by either party, Because the present invention incorporates various safeguards, repudiation of the contract by either party is extremely difficult. For example, not only do approval and execution of the contract require separate deliberate actions by both parties, but authentication is also provided at all phases of the process, including twice for execution. Moreover, the present invention provides an opportunity for appropriate legal notices to be provided.

It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the status of the contract could be changed by a "status system" (not shown) in contract system 34 instead of by the individual systems as described above. Moreover, although certain terminology has been used herein to indicate the various status's of the contract, it should be understood that other versions of terminology could be utilized. Still yet, although 128 bit encryption is indicated as the typical method of encryption, any other type of encryption could be implemented to provide security for the system.

We claim:

1. A method for electronically executing contracts within a secure computer infrastructure, comprising:

obtaining contract information from a receiving contract partner;

creating a contract within the secure computer infrastructure based on the contract information;

requesting approval of the contract within the secure computer infrastructure from an originating contract partner and the receiving contract partner, the requesting including communicating an electronic approval notification to the originating contract partner and communicating an electronic approval notification to the receiving contract partner after approval by the originating contract partner, wherein the electronic approval notifications contain a hyperlink to the secure computer infrastructure;

requesting, after receiving approval from the originating contract partner and the receiving contract partner, execution of the contract within the secure computer infrastructure from the receiving contract partner and the originating contract partner after the contract is approved by the originating contract partner and the receiving contract partner, the requesting including communicating an electronic execution notification to the originating contract partner and communicating an electronic execution notification to the receiving contract partner, wherein the electronic execution notifications contain a hyperlink to the secure computer infrastructure; and generating a final image of the contract within the secure computer infrastructure after the contract is executed by the receiving contract partner and the originating contract partner.

2. The method of claim 1, further comprising:

receiving login information from the originating contract partner;

authenticating the login information;

providing the originating contract partner with access to the contract within the secure computer infrastructure if the login information is authenticated; and receiving an approval determination from the originating partner.

3. The method of claim 1, further comprising:

receiving login information from the receiving contract partner;

authenticating the login information;

providing the receiving contract partner with access to the contract within the secure computer infrastructure if the login information is authenticated; and receiving an approval determination from the receiving partner.

4. The method of claim 1, further comprising:

receiving login information from the originating contract partner;

authenticating the login information;

providing the originating contract partner with access to the contract within the secure computer infrastructure if the login information is authenticated; and receiving an execution determination from the originating partner.

5. The method of claim 1, further comprising:

receiving login information from the receiving contract partner;

authenticating the login information;

providing the receiving contract partner with access to the contract within the secure computer infrastructure if the login information is authenticated; and receiving an execution determination from the receiving partner.

6. The method of claim 1, further comprising tracking all actions taken by the originating contract partner and the receiving contract partner in a database according to time, date and an IP address.

7. The method of claim 1, wherein the secure computer infrastructure is secured using encryption.

8. The method of claim 1, further comprising registering the receiving contract partner prior to the obtaining step, wherein the registering step comprises:

obtaining profile information for the receiving contract partner;

communicating a URL corresponding to the secure infrastructure to the receiving contract partner; and providing login information to the receiving contract partner upon selection of the URL.

9. The method of claim 8, wherein the registering step further comprises checking a credit of the receiving contract partner.

10. The method of claim 1, wherein a status of the contract is indicated as "Submitted" after the contract is generated, wherein the status is indicated as "New" after approval by the originating contract partner, wherein the status is indicated as "Ready to Sign" after approval by the receiving contract partner, wherein the status is indicated as "Signed" after execution by the receiving contract partner, wherein the status is indicated as "Countersigned" after execution by the originating contract partner, and wherein the status is indicated as "Complete" after the final image is generated.

11. The method of claim 1, further comprising receiving an issue list from the receiving contract partner if approval of the contract by the receiving contract partner is not obtained.

12. The method of claim 1, further comprising blocking out comments input by the receiving contract partner is approval of the contract by the receiving contract partner is obtained.

13. A program product stored on a recordable medium for electronically executing contracts within a secure computer infrastructure, which when executed, comprises:

program code for creating a contract within the secure computer infrastructure based on contract information obtained from a receiving contract partner;

program code for requesting and receiving approval determinations for the contract within the secure computer infrastructure from an originating contract partner and the receiving contract partner, wherein program code for approving communicates separate electronic approval notifications to the originating contract partner and to the receiving contract partner, wherein the electronic approval notifications each contain a hyperlink to the secure computer infrastructure;

program code for, after receiving approval from the originating contract partner and the receiving contract partner, requesting and receiving execution determinations for the contract within the secure computer infrastructure from the receiving contract partner and the originating contract partner after the contract is approved by the originating contract partner and the receiving contract partner, wherein the program code for executing communicates separate electronic execution notifications to the originating contract partner and to the receiving contract partner, wherein the electronic execution notifications each contain a link to the secure computer infrastructure; and program code for generating a final image of the contract within the secure computer infrastructure after the contract is executed by the receiving contract partner and the originating contract partner.

14. The program product of claim 13, further comprising program code registering the receiving contract partner, wherein the program code for registering obtains profile information for the receiving contract partner, and communicates a URL corresponding to the secure infrastructure to the receiving contract partner.

15. The program product of claim 14, wherein the program code for registering further checks a credit of the receiving contract partner.

16. The program product of claim 13, further comprising program code for authenticating login information for the originating contract partner and the receiving contract partner.

17. The program product of claim 13, further comprising program code for securing the secure computer infrastructure using encryption.

18. The program product of claim 13, further comprising program code for tracking all activities by the originating contract partner and the receiving contract partner within the secure computer infrastructure according to time, date and IP address.

19. The program product of claim 13, further comprising program code for maintaining a status of the contract, wherein a status of the contract is indicated as "Submitted" after the contract is generated, wherein the status is indicated as "New" after approval by the originating contract partner, wherein the status is indicated as "Ready to Sign" after approval by the receiving contract partner, wherein the status is indicated as "Signed" after execution by the receiving contract partner, wherein the status is indicated as "Countersigned" after execution by the originating contract partner, and wherein the status is indicated as "Complete" after the final image is generated.

* * * * *